US009525483B2

(12) United States Patent
Johnson, IV et al.

(10) Patent No.: US 9,525,483 B2
(45) Date of Patent: Dec. 20, 2016

(54) ACTIVELY MONITORED OPTICAL FIBER PANEL

(71) Applicant: Verizon Patent and Licensing Inc., Arlington, VA (US)

(72) Inventors: Raymond Johnson, IV, Kaufman, TX (US); Daniel L. Peterson, Jr., Sachse, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 14/660,350

(22) Filed: Mar. 17, 2015

(65) Prior Publication Data

US 2016/0277103 A1   Sep. 22, 2016

(51) Int. Cl.
| | |
|---|---|
| H04J 14/02 | (2006.01) |
| H05K 7/02 | (2006.01) |
| H04J 14/00 | (2006.01) |
| G02B 6/26 | (2006.01) |
| H04B 10/079 | (2013.01) |
| G02B 6/42 | (2006.01) |

(52) U.S. Cl.
CPC ......... *H04B 10/0795* (2013.01); *G02B 6/4286* (2013.01); *H04J 14/021* (2013.01)

(58) Field of Classification Search
CPC .. H04B 10/0795; H04J 14/0297; H04J 14/021
USPC .......................................... 398/29, 26, 9, 1
See application file for complete search history.

(56) References Cited

U.S. PATENT DOCUMENTS

| | | | | |
|---|---|---|---|---|
| 6,626,587 | B1 * | 9/2003 | Marmur ................. | H04B 10/00 14/38 |
| 6,804,463 | B1 * | 10/2004 | Arecco .............. | H04Q 11/0005 398/16 |
| 2002/0165962 | A1 * | 11/2002 | Alvarez .................... | G06F 8/65 709/226 |
| 2003/0091267 | A1 * | 5/2003 | Alvarez ............. | H04Q 11/0005 385/16 |
| 2004/0022494 | A1 * | 2/2004 | Liddle .................. | G02B 6/3636 385/48 |
| 2004/0202471 | A1 * | 10/2004 | Bethea .................... | H04J 14/08 398/53 |
| 2005/0018953 | A1 * | 1/2005 | Martin, Jr. .............. | H04J 14/02 385/16 |
| 2006/0210229 | A1 * | 9/2006 | Scadden .............. | G02B 6/4452 385/135 |
| 2007/0047875 | A1 * | 3/2007 | Sezerman .......... | H04B 10/0795 385/48 |

(Continued)

*Primary Examiner* — Oommen Jacob (57) ABSTRACT

An optical fiber panel unit includes multiple fiber input ports, each configured to connect to a different one of multiple optical fibers. Each fiber input port includes a connector port configured to connect to a respective fiber panel optical path, an optical tap and a photo-detector. The optical tap is configured to couple to the respective optical path. The photo-detector couples to the optical tap to detect optical signals carried over the respective optical path, and to produce electrical signals that correspond to the detected optical signals. A telemetry circuit analyzes the electrical signals that correspond to the detected optical signals of each respective optical path, and determines at least one of a loss of signal (LOS) or loss of light (LOL) at each of the fiber input ports based on the analysis of the electrical signals.

20 Claims, 9 Drawing Sheets

(56) References Cited

U.S. PATENT DOCUMENTS

| | | | |
|---|---|---|---|
| 2008/0063397 A1* | 3/2008 | Hu | H04J 14/0282 |
| | | | 398/43 |
| 2008/0205885 A1* | 8/2008 | Watte | G01M 11/3118 |
| | | | 398/25 |
| 2009/0110391 A1* | 4/2009 | Matityahu | H04B 10/075 |
| | | | 398/25 |
| 2010/0302754 A1* | 12/2010 | Nordin | G02B 6/4452 |
| | | | 361/810 |
| 2010/0316334 A1* | 12/2010 | Kewitsch | G02B 6/3502 |
| | | | 385/78 |
| 2014/0077971 A1* | 3/2014 | Archambault | H04Q 9/00 |
| | | | 340/870.04 |
| 2015/0093073 A1* | 4/2015 | Wright | G02B 6/2804 |
| | | | 385/24 |
| 2015/0162982 A1* | 6/2015 | Buff | H04B 10/25 |
| | | | 398/142 |
| 2015/0347259 A1* | 12/2015 | Katou | G06F 3/048 |
| | | | 348/143 |

\* cited by examiner

ACTIVELY MONITORED OPTICAL FIBER PANEL

BACKGROUND

Fiber optic networks are widely used for transmitting data at high speeds to and from customer locations. Such networks typically include central offices that each include one or more Optical Add/Drop Multiplexers (OADMs), such as Reconfigurable OADMs (ROADMs) that perform optical wavelength selective switching of optical signals on incoming optical fibers to outgoing optical fibers such that data traffic may be routed to and from customer locations. Each customer location may include its own ROADM for selective switching of optical signals received from the ROADM in the central office. The ROADM in each customer location switches incoming optical signals to destination customer site equipment, or switches outgoing optical signals from source customer site equipment to the ROADM in the central office.

DETAILED DESCRIPTION OF THE PREFERRED EMBODIMENTS

The following detailed description refers to the accompanying drawings. The same reference numbers in different drawings may identify the same or similar elements. The following detailed description does not limit the invention.

In many circumstances where fiber optic networks are used for transporting data traffic, the customer location can be a relatively short distance (e.g., one mile) from the central office (CO), and also many customer locations can be co-located within a short distance of one another (e.g., in a same building). In such circumstances, the use of numerous different ROADMs at each customer location for switching optical traffic is a costly approach, with each ROADM taking up a significant amount of space and using a large amount of power for the limited nature of the customer location. Exemplary embodiments described herein use a fiber panel unit at each customer location that, relative to use of a ROADM, is less costly, takes up less space, and uses less power. A counterpart fiber panel unit may also be placed in the CO and connected to the CO's ROADM, and the CO's fiber panel unit and each customer location fiber panel unit may be interconnected via a short length span (i.e., less than one mile) of optical line fibers.

Figure 1:
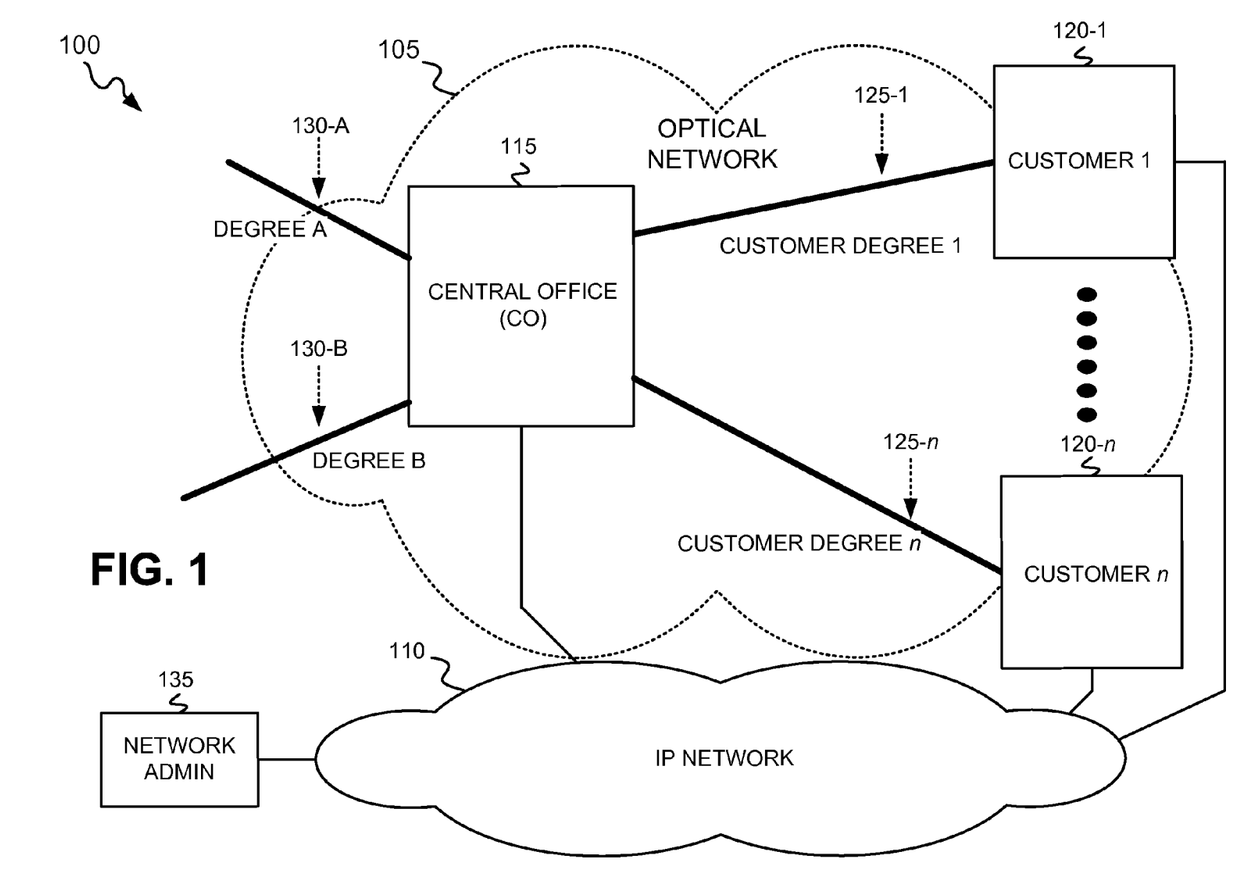
FIG. 1 depicts an exemplary network environment in which actively monitored fiber panels may be used at customer locations and associated central offices for sending optical data traffic to, and receiving optical data traffic from, the customer locations.

FIG. 1 depicts an exemplary network environment 100 in which actively monitored fiber panel units may be used at customer locations and associated COs for sending optical data traffic to, and receiving optical data traffic from, the customer locations. Network environment 100 may include an optical network 105 and an Internet Protocol (IP) network 110. FIG. 1 depicts a portion of optical network 105 (the portion is shown within the dashed lines defining optical network 105), where the portion includes a Central Office (CO) 115 interconnected with multiple customer locations 120-1 through 120-*n* (where n comprises an integer that is greater than or equal to one) via optical fiber links identified as customer degrees 125-1 through 125-*n*. CO 115 may connect with other COs, or other nodes within optical network 105, via optical fiber links, with two being shown in FIG. 1 as degree A 130-A and degree B 130-B. CO 115 may include switching components, not shown in FIG. 1, for switching optical signals associated with data traffic from optical network 105 to customer locations 120-1 through 120-*n*, and from customer locations 120-1 through 120-*n* to optical network 105. Optical network 105 may include numerous COs 115, with each CO being interconnected with one or more customer locations 120. Optical network 105 may additionally include other network nodes and components than those shown in the portion depicted in FIG. 1.

IP network 110 may include any type of packet-switched network that may use IP for transporting data traffic. IP network 110 may also include one or more wired or wireless networks. The wired networks may include one or more of a local area network (LAN), a wide area network (WAN), a metropolitan area network (MAN), a cable network, a Public Switched Telephone Network (PSTN), an intranet, and/or the Internet. The wireless networks may include one or more of a wireless satellite network and/or a wireless public land mobile network (PLMN). In one exemplary implementation, IP network 110 may include the Internet. As shown, a network administrator (admin) node 135 may be connected to IP network 110. Network admin node 135 may include a network device that receives status and/or performance characteristic reports from fiber panel units (described with respect to FIG. 2 below) located at CO 115, customer locations 120-1 through 120-*n*, and at other COs and customer locations 120 of optical network 105. Network admin node 135 may be operated, for example, by a network manager that remotely monitors fiber panel units 210 throughout optical network 105 for network operations, network performance, and network security and/or surveillance. Network admin node 135 may analyze the status and/or performance characteristic reports received from fiber panel units 210 to identify the location(s) of loss of signal (LOS) or loss of light (LOL) as well as the source and direction of any optical fault.

The configuration of network components of network environment 100 illustrated in FIG. 1 is for illustrative purposes. Other configurations may be implemented. Therefore, network environment 100 may include additional, fewer and/or different components that may be configured in a different arrangement than those depicted in FIG. 1. For example, though only a single CO 115 connected to customer locations 120-1 through 120-n are shown in the portion of optical network 105 of FIG. 1, optical network 105 may include multiple different COs 115, each being connected to one or more customer locations 120.

Figure 2:
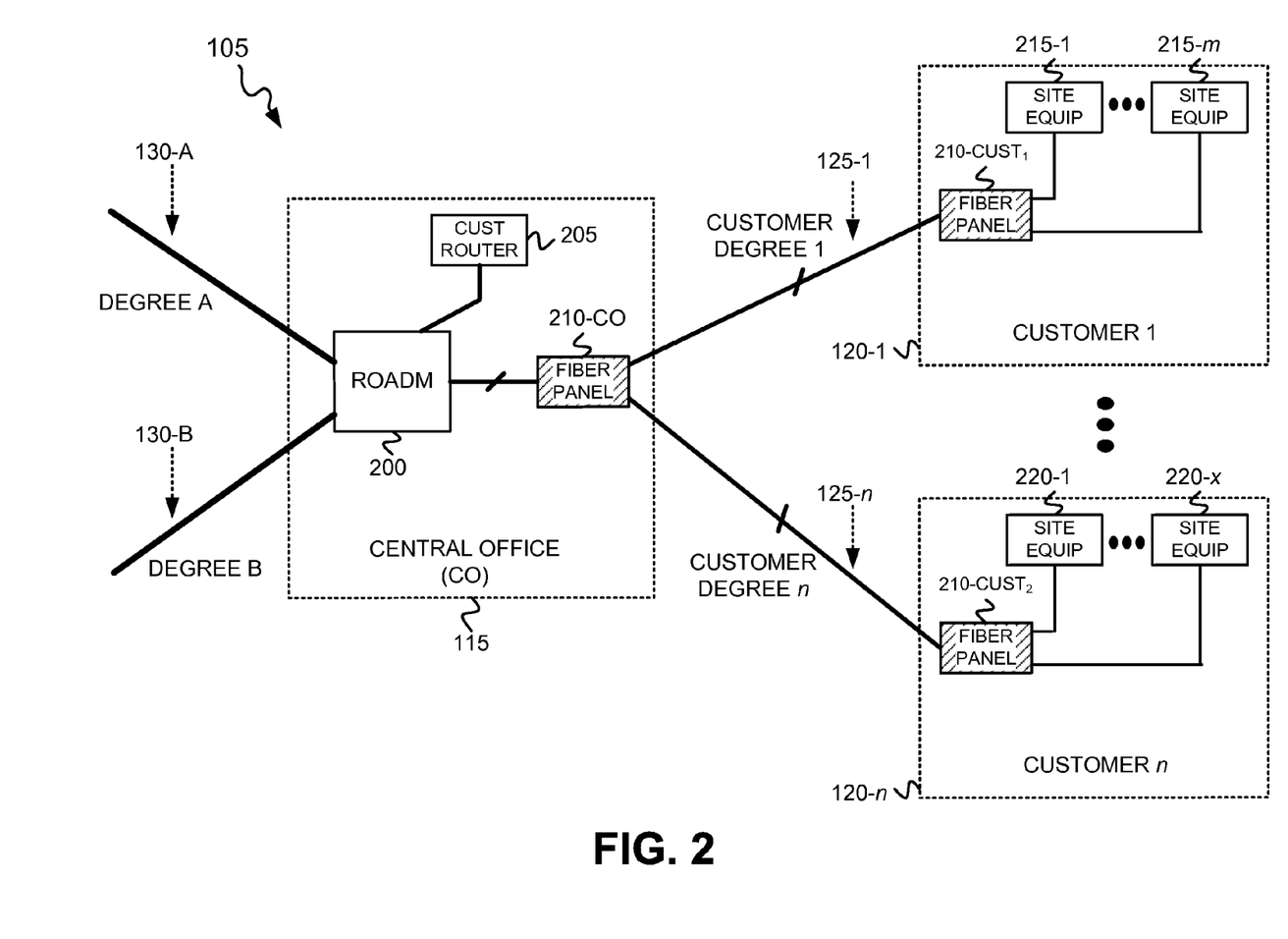
FIG. 2 depicts exemplary components of the central office and customer locations of the portion of optical network depicted in FIG. 1.

FIG. 2 depicts exemplary components of the CO 115 and customer locations 120-1 through 120-n of the portion of optical network 105 depicted in FIG. 1. As shown, CO 115 may include a ROADM 200 connected to other nodes (not shown) in optical network 105 via optical fiber(s) 130-A (identified as "Degree A") and optical fiber(s) 130-B (identified as "Degree B"). CO 115 may further include a fiber panel unit 210-CO and a customer router 205 connected to ROADM 200. The fiber connection between ROADM 200 and fiber panel unit 210-CO may include (as depicted with a cross-hatch on the fiber line) multiple optical fibers connecting ROADM 200 and fiber panel unit 210-CO. Fiber panel unit 210-CO of CO 115 may connect to fiber panel units 210-CUST$_1$ through 210-CUST$_n$ of corresponding customer locations 120-1 through 120-n via optical fiber links 125-1 through 125-n. As depicted with a cross-hatch, each of fiber links 125-1 through 125-n may include multiple optical fibers. At customer location 120-1, fiber panel unit 210-CUST$_1$ further connects to one or more site equipment 215-1 through 215-m. At customer location 120-n, fiber panel unit 210-CUST$_n$ further connects to one or more site equipment 220-1 through 220-x. Fiber panel units 210-CO, and 210-CUST$_1$ through 210-CUST$_n$ (referred to individually and generically herein as "fiber panel unit 210," and collectively as "fiber panel units 210") are described in further detail with respect to the exemplary implementations of FIGS. 3A, 3B, 4, 5 and 6 below.

Optical data traffic received via fiber line 130-A at CO 115 may be switched by ROADM 200 out respective optical fiber connections to fiber panel unit 210-CO which, in turn, carries the optical data traffic via the optical fiber connections to fiber panel units 210-CUST$_1$ through 210-CUST$_n$. Fiber panel units 210-CUST$_1$ through 210-CUST$_n$ further carry the optical data traffic to respective destination site equipment 215-1 through 215-m and 220-1 through 220-x.

Each of fiber panel units 210-CO, and 210-CUST$_1$ through 210-CUST$_n$ includes telemetry circuitry, described in further detail below with respect to FIGS. 3A, 3B, 4, 5 and 6, that analyzes performance characteristics of optical data traffic carried by the fiber panel units 210, and reports the results of that analysis via IP network 110 to another fiber panel unit 210 and/or to network admin node 135 (FIG. 1). For example, fiber panel unit 210-CUST$_1$ may analyze performance characteristics of optical data traffic received via optical fiber link 125-1 and report the results of the analysis to fiber panel unit 210-CO and/or to a network administrator node (e.g., network admin node 135 not shown in FIG. 2) connected to IP network 110.

Site equipment 215-1 through 215-m and 220-1 through 220-x may include any type of equipment (e.g., switches, routers, servers, etc.) at a respective customer location 120 that may engage in sending and/or receiving data traffic.

The configuration of components of CO 115, and each of customer locations 120-1 through 120-n, illustrated in FIG. 2 is for illustrative purposes. Other configurations may be implemented. Therefore, each of CO 115 and customer locations 120-1 through 120-n may include additional, fewer and/or different components that may be configured in a different arrangement than those depicted in FIG. 2. For example, ROADM 200 in CO 115 may include a different type of optical switching device than a ROADM.

Figure 3A:
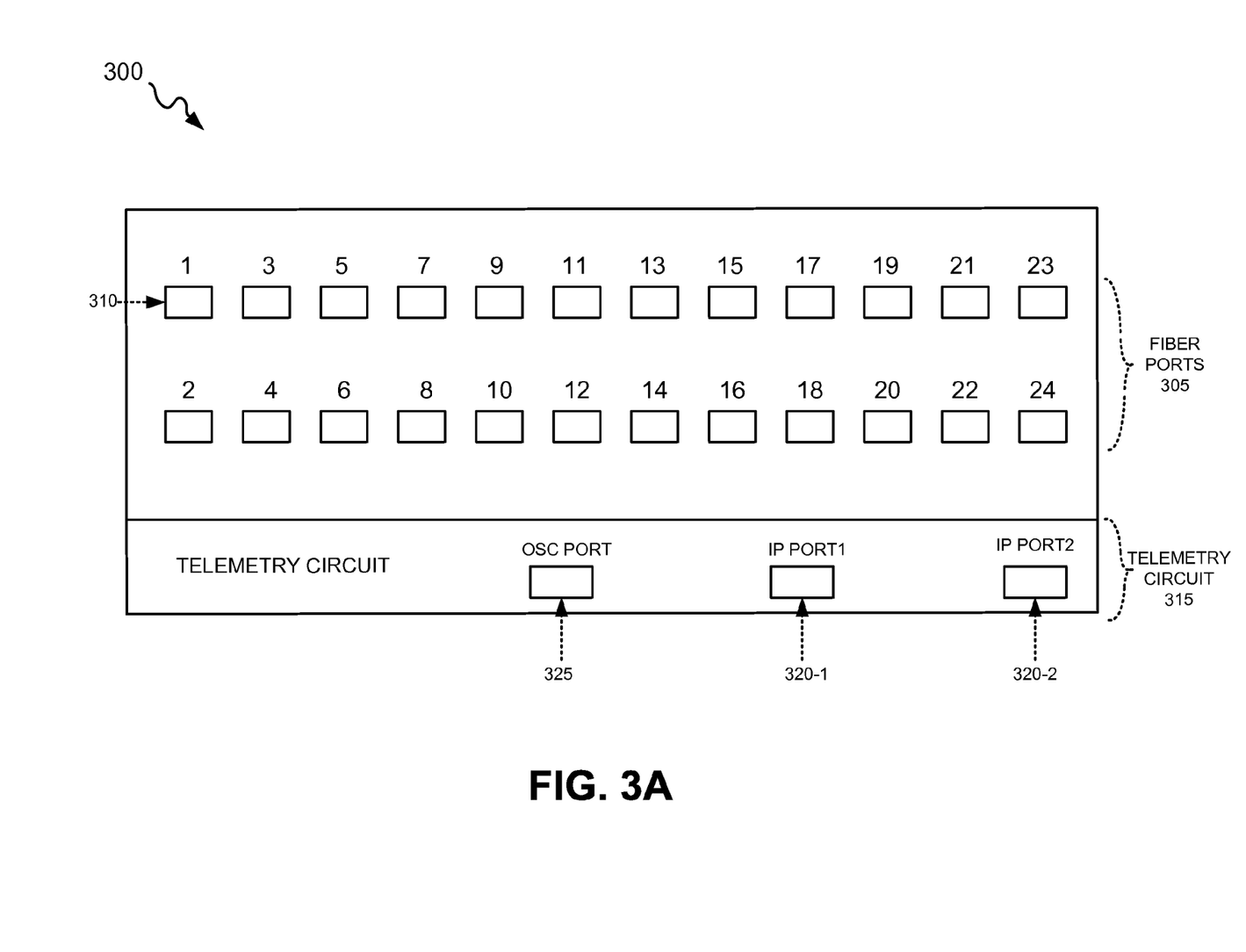
FIGS. 3A and 3B depict front and rear panels of a fiber panel unit of FIG. 2.
Figure 3B:
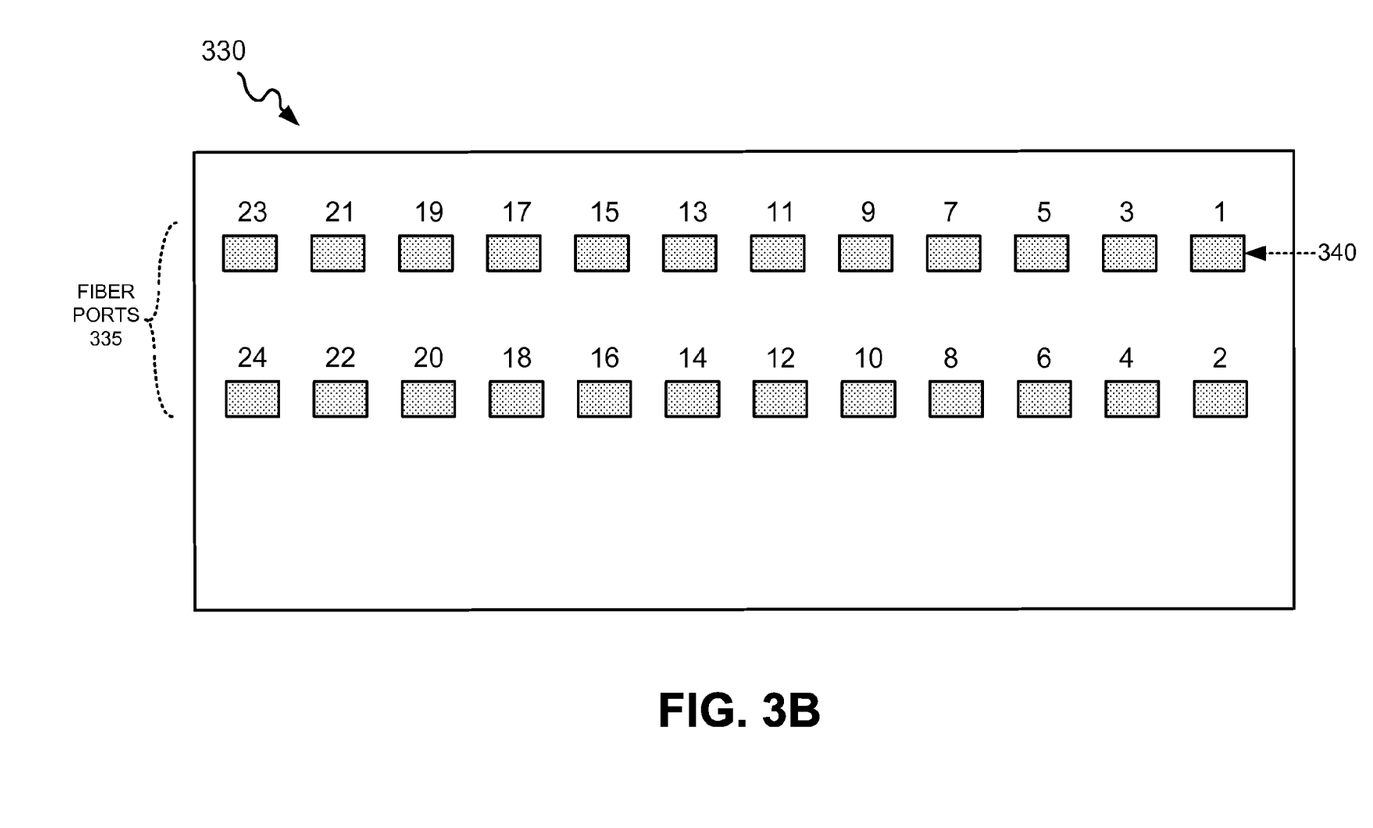

FIGS. 3A and 3B depict front and rear panels of fiber panel unit 210. With respect to fiber panel unit 210-CO, located in CO 115, FIG. 3B depicts a front panel of fiber panel unit 210-CO faced towards ROADM 200 and FIG. 3A depicts a rear panel of fiber panel unit 210-CO faced towards customer locations 120-1 through 120-n. With respect to fiber panel units 210-CUST$_1$ through 210-CUST$_n$, FIG. 3A depicts a front panel of fiber panel unit 210-CUST faced towards fiber panel unit 210-CO of CO 115, and FIG. 3B depicts a rear panel of fiber panel unit 210-CUST faced towards site equipment 215-1 through 215-m or 220-1 through 220-x. Therefore, panel 300, as depicted in FIG. 3A, includes the rear panel of fiber panel unit 210-CO or the front panel of fiber panel unit 210-CUST. Panel 330, as depicted in FIG. 3B, includes the rear panel of fiber panel unit 210-CUST and the front panel of fiber panel unit 210-CO.

As shown in FIG. 3A, panel 300 may include a fiber ports 305 section of the panel and a telemetry circuit 315 section of the panel. Fiber ports 305 section includes multiple different optical fiber ports 310, with each optical fiber port including an optical fiber connector. In the exemplary implementation shown in FIG. 3A, fiber port 305 section may include 24 different optical fiber ports 310. However, panel 300 may include any number of optical fiber ports 310. Telemetry circuit 315 section includes IP ports 320-1 and 320-2 and an Optical Service Channel (OSC) port 325.

Each of the different optical fiber ports 310 of fiber ports 305 section of panel 300 includes an optical path connected to fiber ports 335 of panel 330 of FIG. 3B, optical components associated with the telemetry circuit 315 and the optical path, and electrical circuit components that connect to the telemetry circuit 315. Fiber ports 335 section of panel 330 includes multiple different optical fiber ports 340, with each optical fiber port including an optical fiber connector. In the exemplary implementation shown in FIG. 3B, fiber port 335 section may include 24 different optical fiber ports 340. However, panel 330 may include any number of optical fiber ports 340. Telemetry circuit 315 section of panel 300 includes circuitry for analyzing performance characteristics associated with each optical fiber port 310 of panel 300. Telemetry circuit 315 section may send reports that detail the performance characteristics of each optical fiber port 310 via IP ports 320-1 and 320-2 and may send fiber panel status reports and/or reports of the performance characteristics via OSC port 325.

IP ports 320-1 and 320-2 may include connector ports for electrically connecting telemetry circuit 315 to IP network 110. IP port 320-1 may include a port that permits remote access by CO 115 or by network admin node 135 via IP network 110. IP port 320-2 may include a port that permits remote access by a customer via IP network 110. In some circumstances, the customer may include a customer residing at customer location 120. In other circumstances, the customer may include a customer network manager that remotely accesses fiber panel units 210 at multiple different customer locations 120 via IP network 110. OSC port 325 may include a connector port for connecting an optical fiber that spans to another OSC port 325 at a counterpart fiber panel unit 210. For example, OSC port 325 of fiber panel unit 210-CO in CO 115 may connect via optical fiber to OSC port 325 of fiber panel unit 210-CUST$_1$ in customer location 120-1.

Figure 4:
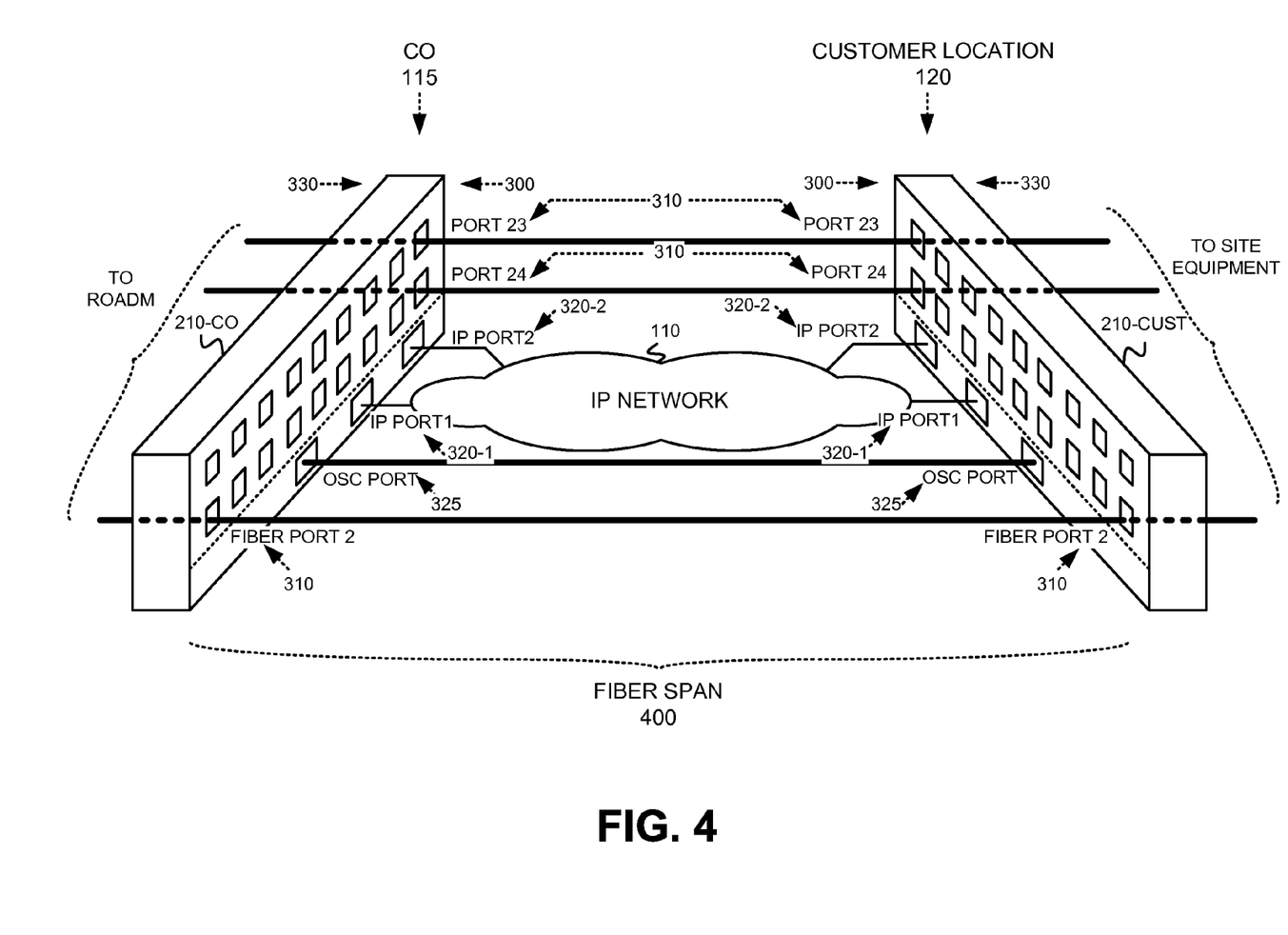
FIG. 4 depicts an exemplary implementation of a fiber panel unit of a central office interconnected with a fiber panel unit at a customer location via optical fibers over a fiber span.

FIG. 4 depicts an exemplary implementation of a fiber panel unit 210-CO of a CO 115 interconnected with a fiber panel unit 210-CUST at a customer location 120 via optical fibers over a fiber span 400. Fiber span 400 may include a distance between CO 115 and customer location of, for example, one mile or less. For purposes of illustration, FIG.

4 depicts the connection of optical fibers only to fiber ports 2, 23 and 24 of fiber panel units 210-CO and 210-CUST. Fewer, or more, of the fiber ports of fiber panel unit 210-CO and fiber panel unit 210-CUST may be used to connect optical fibers between the fiber panel units than those shown in FIG. 4.

As shown in the exemplary implementation of FIG. 4, an optical fiber connects fiber port 2 310 of fiber panel unit 210-CO and fiber port 2 310 of fiber panel unit 210-CUST over fiber span 400, an optical fiber connects fiber port 23 310 of fiber panel unit 210-CO and fiber port 23 310 of fiber panel unit 210-CUST over fiber span 400, and an optical fiber connects fiber port 24 310 of fiber panel unit 210-CO and fiber port 24 310 of fiber panel unit 210-CUST over fiber span 400. As further shown in FIG. 4, an optical fiber connects OSC port 325 of fiber panel unit 210-CO in CO 115 to OSC port 325 of fiber panel unit 210-CUST in customer location 120. IP ports 320-1 and 320-2 of fiber panel unit 210-CO of CO 115 further connect to IP network 110 and IP ports 320-1 and 320-2 of fiber panel unit 210-CUST of customer location 120 further connect to IP network 110.

Figure 5:
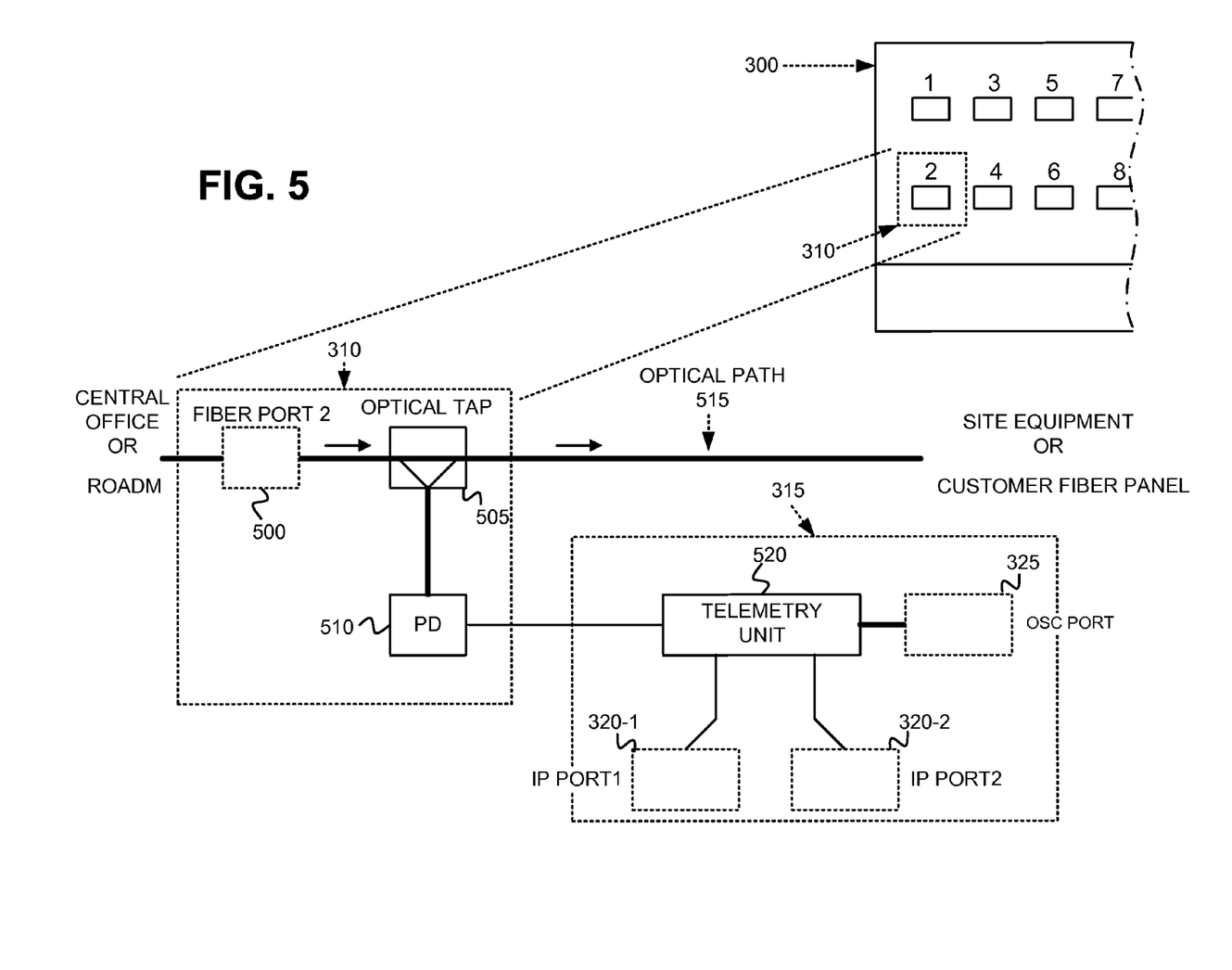
FIG. 5 depicts exemplary details of a fiber port of the fiber panel unit of FIGS. 3A and 3B.

FIG. 5 depicts exemplary details of a fiber port 310. As shown, fiber port 310 includes a fiber connector 500, an optical tap 505 connected in series with fiber connector 500 via an optical path 515, and a photo-detector 510. Optical tap 505 includes a first optical output connected to a photo-detector (PD) 510 and a second optical output connected to optical path 515. Optical path 515 connects to a corresponding fiber port 340 of panel 330 of fiber panel unit 210. Optical tap 505 may include, for example, an optical splitter for splitting incoming optical signals into two identical (or nearly identical) outputs. Photo-detector 510 may include, for example, an avalanche photodiode (APD) or other type of photo-detector that detects optical signals received via the second output of optical tap 505, converts the optical signals to corresponding electrical signals, and supplies the electrical signals to telemetry circuit 315. Telemetry circuit 315 may include a telemetry unit 520, IP ports 320-1 and 320-2 for connecting to IP network 110, and OSC port 325 for connecting to an OSC port of another fiber panel 210. Telemetry circuit 315 is described further below with respect to FIG. 6.

Figure 6:
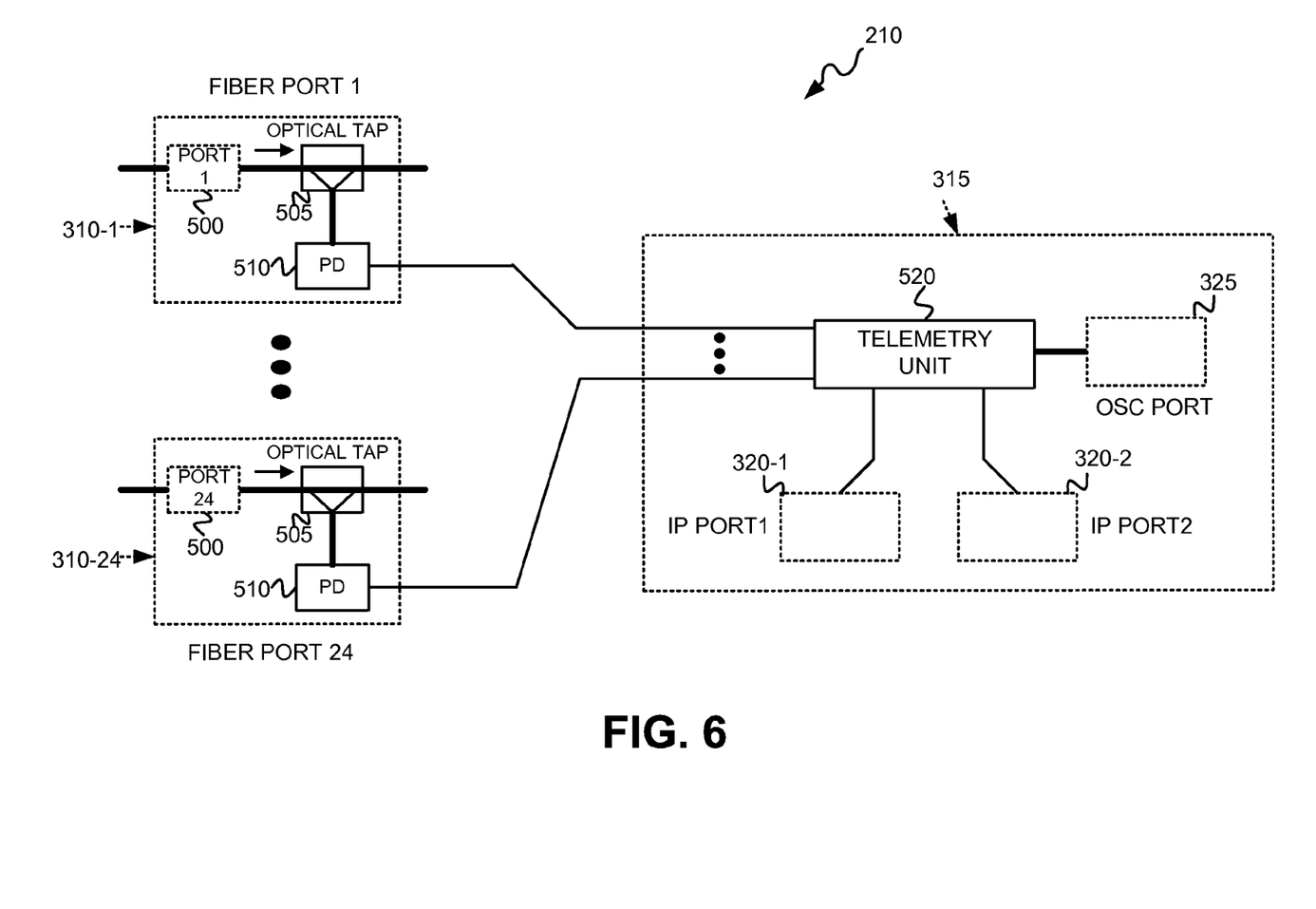
FIG. 6 depicts the interconnection of multiple fiber ports with a telemetry circuit of a fiber panel unit.

FIG. 6 depicts the interconnection of multiple fiber ports 310-1 through 310-24 with telemetry circuit section 315 of a fiber panel unit 210. The detected optical signals from each photo-detector 510 of a fiber port 310 are connected to an input of telemetry unit 520 of telemetry circuit 315 section. Telemetry unit 520 may include, among other components, a processing unit that may analyze the electrical signals carried via each fiber port 310-1 through 310-24 to determine performance characteristics associated with each fiber connector 500. The processing unit may include one or more processors or microprocessors, or processing logic. One or more memory devices (not shown in FIGS. 5 and 6) may be associated with telemetry unit 520 for storing data and instructions for use by telemetry unit 520. The memory devices may be referred to as a "tangible non-transitory computer-readable medium." The process/method set forth herein can be implemented as instructions that are stored in a memory device for execution by telemetry unit 520.

The performance characteristics determined by analyzing the electrical signals associated with the detected optical signals carried via each fiber port 310, may include, for example, the existence of a LOS and/or the existence of a LOL at each fiber port 310. Detecting LOL on a fiber port 310 may include detecting the presence, or lack of presence, of light of one or more wavelengths at fiber port 310.

Detecting LOS on a fiber port 310 may include detecting the occurrence of modulation of light (e.g., optical 1' and 0's) at fiber port 310. Other types of performance characteristics may be analyzed by telemetry unit 520, such as intermittent LOS and/or LOS at each fiber port 310. Telemetry unit 520 may store inventory details (e.g., circuit identifiers (IDs)) of what is on each of fiber ports 310. Telemetry unit 520 may send reports via IP ports 320-1 and 320-2 that detail the analyzed performance characteristics, and the stored inventory details, associated with each fiber port 310. Telemetry unit 520 may, using components (e.g., optical components) not shown in FIG. 6, additionally send status reports and/or performance characteristic reports via OSC port 325 to a corresponding fiber panel at CO 115 to report the status of fiber panel unit 210 and/or to report the analyzed performance characteristics of fiber ports of fiber panel unit 210 to another fiber panel unit 210 at a customer location 120. For example, referring back to FIG. 4, fiber panel unit 210-CUST at customer location 120 may report the status of fiber panel unit 210-CUST and/or report the analyzed performance characteristics of the different fiber ports of fiber panel unit 210-CUST to fiber panel unit 210-CO at CO 115 via OSC port 325. Conversely, referring again to FIG. 4, fiber panel unit 210-CO at CO-115 may report the status of fiber panel unit 210-CO and/or report the analyzed performance characteristics of the different fiber ports of fiber panel unit 210-CO to fiber panel unit 210-CUST at customer location 120 via OSC port 325.

Figure 7A:
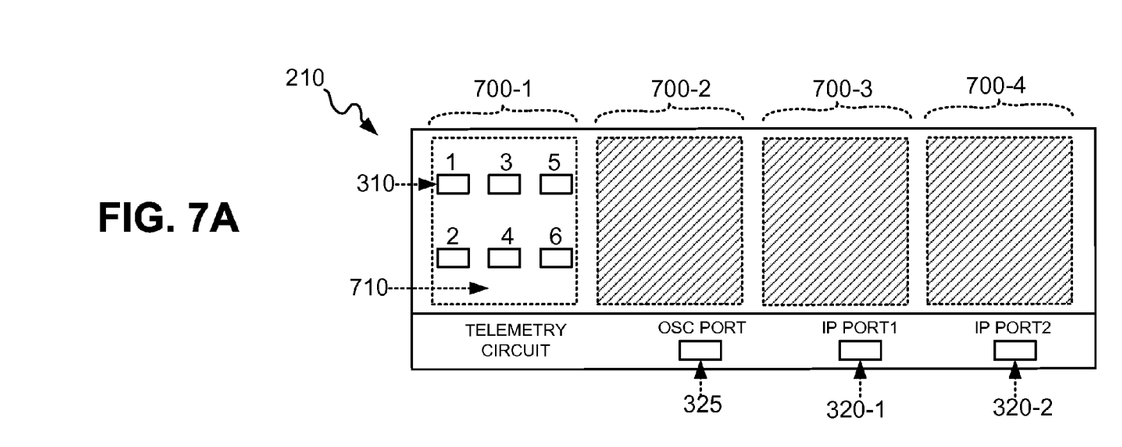
FIGS. 7A and 7B are diagrams that show an exemplary implementation of a fiber panel unit where the fiber panel unit includes a modular capability that permits the addition or reduction of a number of fiber ports in the fiber panel unit.
Figure 7B:
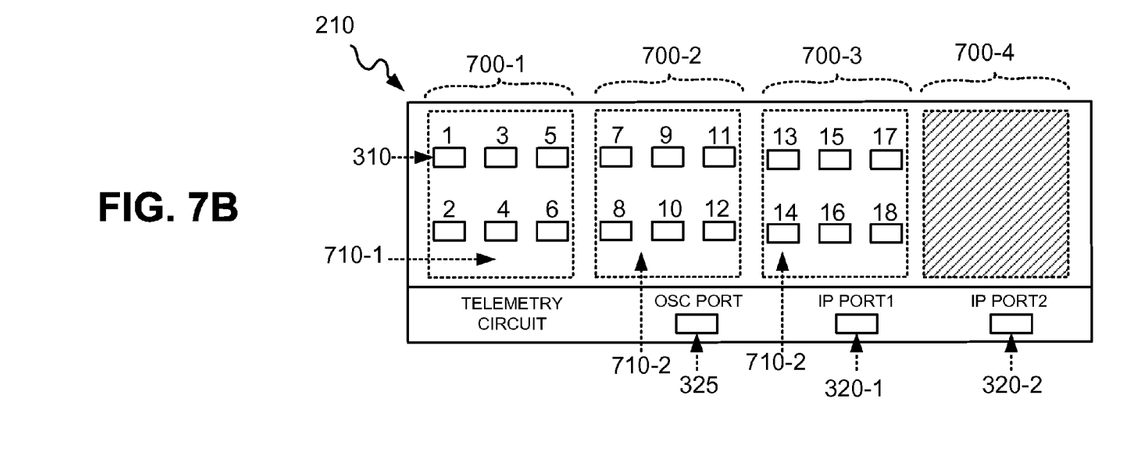

FIGS. 7A and 7B show an exemplary implementation of fiber panel unit 210 in which fiber panel unit 210 includes a modular capability that permits the addition or reduction of a number of fiber ports 310 in fiber panel unit 210. For example, as shown in FIG. 7A, fiber panel unit 210 may include multiple fiber port bays 700-1 through 700-4 into which modular blocks of fiber ports 310 may be inserted. Each modular block of fiber ports 310 may include a certain number (6 shown in the example of FIG. 7A) of fiber ports 310. In the example of FIG. 7A, fiber port bays 700-2 through 700-4 are depicted as being empty and fiber port bay 700-1 is shown as having fiber port modular block 710 inserted. The example of FIG. 7A, therefore, includes only fiber ports 1-6. FIG. 7B depicts another example where fiber port bay 700-4 is empty and fiber port bays 700-1, 700-2, and 700-3 have fiber port modular blocks 710-1, 710-2 and 710-3 inserted. In the example of FIG. 7B, with fiber port modular blocks 710-1 through 710-3 inserted, fiber panel unit 210 includes fiber ports 1-18.

Figure 8:
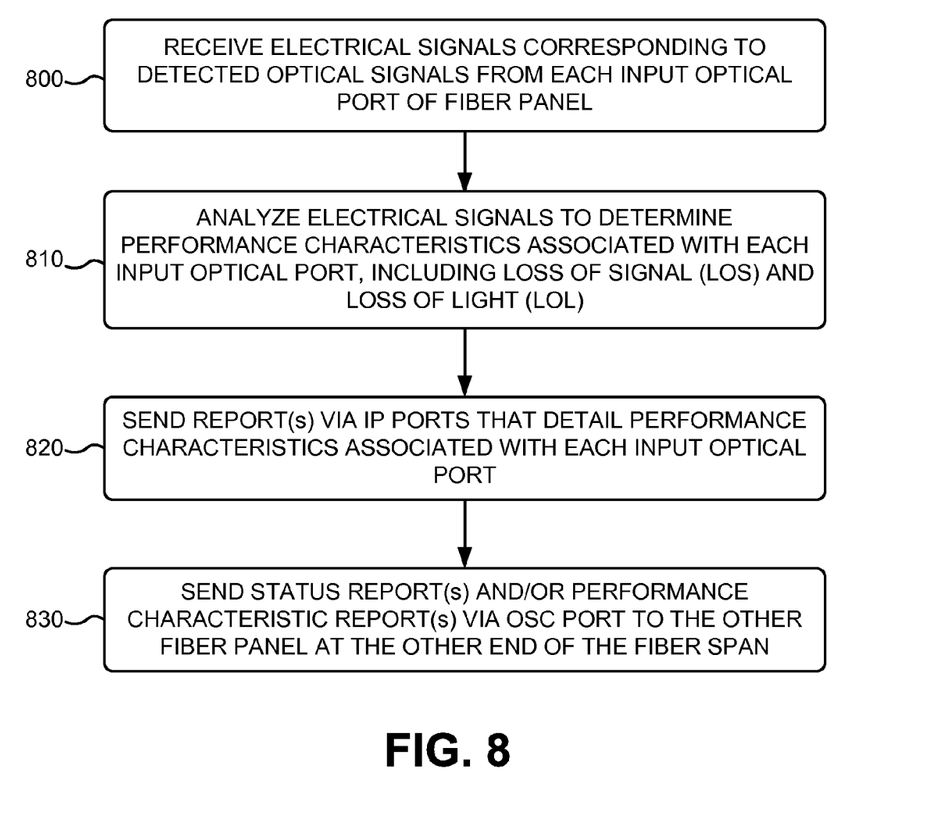
FIG. 8 is a flow diagram of an exemplary process for actively monitoring and reporting the operation of a fiber panel unit of the network environment of FIG. 1.

FIG. 8 is a flow diagram of an exemplary process for actively monitoring and reporting the operation of a fiber panel unit 210. The exemplary process of FIG. 8 may be performed by telemetry unit 520 of telemetry circuit 315 of fiber panel unit 210. The exemplary process of FIG. 8 is described below with reference to FIGS. 4 and 6. The exemplary process of FIG. 8 may be performed continuously, at periodic intervals, upon the occurrence of a certain event, or on-demand (e.g., upon receipt of a signal from network admin node 135).

The exemplary process may include telemetry unit 520 receiving electrical signals corresponding to detected optical signals from each input optical fiber port 310 of fiber panel 210 (block 800). Referring to FIG. 6, optical signals received at fiber port 310-1 are tapped by optical tap 505 and then detected by photo-detector 510 to generate corresponding electrical signals. Telemetry unit 520 receives, via an input, the electrical signals from photo-detector 510. Telemetry unit 520, as shown in FIG. 6, receives electrical signals corresponding to detected optical signals from each photo-detector 510 of optical fiber ports 310-1 through 310-24.

Telemetry unit 520 analyzes the electrical signals to determine performance characteristics associated with each input optical fiber port 310 of fiber panel 120, including LOS and LOL (block 810). Telemetry unit 520 may analyze the electrical signals to detect LOL by detecting the presence, or lack of presence, of light of one or more wavelengths at each fiber port 310. Telemetry unit 520 may analyze the electrical signals to detect LOS on a fiber port 310 by detecting the occurrence, or lack of occurrence, of modulation of light (e.g., 1' and 0's in the corresponding electrical signals) at fiber port 310. Other types of performance characteristics, other than LOS and LOL, may be analyzed by telemetry unit 520.

Telemetry unit 520 may send a report(s) via IP ports 320-1 and 320-2 that details the performance characteristics associated with each optical fiber port 310 (block 820). The report(s) sent via IP port 320-1 may be sent to CO 115 and/or to network admin node 135. The report(s) sent via IP port 320-2 may be sent to a customer associated with a customer location 120 at which the fiber panel unit 210 is located. The reports that detail the performance characteristics may additionally include the inventory details (e.g., circuit IDs) of what is connected to each of fibers ports 310. Telemetry unit 520 may also send a status report(s) and/or performance characteristic report(s) via OSC port 325 to the other fiber panel unit 210 at the other end of fiber span 400 (block 830). If the fiber panel being monitored is fiber panel unit 210-CUST at a customer location 120, then telemetry unit 520 may send a status report(s) via OSC port 325 to a corresponding OSC port 325 at fiber panel unit 210-CO of CO 115 (i.e., referring to FIG. 4, status report(s) sent from fiber panel unit 210-CUST at customer location 120 to fiber panel unit 210-CO at CO 115). If the fiber panel being monitored is fiber panel unit 210-CO at CO 115, then telemetry unit 520 may send a status report(s) via OSC port 325 to a corresponding OSC port 325 at fiber panel unit 210-CUST at customer location 120 (i.e., referring to FIG. 4, status report(s) sent from fiber panel unit 210-CO at CO 115 to fiber panel 210-CUST at customer location 120).

The exemplary process of FIG. 8 may be performed at each fiber panel unit 210 in optical network 105 such that a network node, such as network admin node 135, may receive reports that detail performance characteristics of each optical fiber port 310 of fiber panel unit 210 and/or may receive reports detailing a status of fiber panel unit 210. The remote network node (e.g., network admin node 135) may actively monitor the incoming reports to identify status and performance information associated with each fiber panel unit 210 for the purposes of traffic routing, network resource management (e.g., adding additional fiber panels or COs), and/or maintenance or repair scheduling. The remote network node (e.g., network admin node 135 or a customer network manager node) may receive reports from multiple different fiber panel units 210 in optical network 105 such that fiber panel operation across multiple different COs 115 and customer locations 120 may be simultaneously monitored and remotely accessed. The remote network node may remotely monitor fiber panel units 210 throughout optical network 105 for network operations, network performance, and network security and/or surveillance. For example, the remote network node (e.g., network admin node 135 or a customer network manager node) may analyze the status and/or performance characteristic reports received from fiber panel units 210 to identify the location(s) of LOS or LOL as well as the source and direction of any optical fault.

The foregoing description of implementations provides illustration and description, but is not intended to be exhaustive or to limit the invention to the precise form disclosed. Modifications and variations are possible in light of the above teachings or may be acquired from practice of the invention. For example, while a series of blocks has been described with respect to FIG. 8, the order of the blocks may be varied in other implementations. Moreover, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A first optical fiber panel unit, comprising:
   a plurality of fiber input ports, each configured to connect to a different one of multiple optical fibers, wherein each fiber input port comprises:
   a connector port configured to connect to a respective fiber panel optical path,
   an optical tap configured to couple to the respective optical path, and
   a photo-detector coupled to the optical tap and configured to:
   detect optical signals carried over the respective optical path, and
   produce electrical signals that correspond to the detected optical signals; and
   a telemetry circuit, which includes an optical port connected to a fiber link that connects to a second optical fiber panel unit at another location in an optical network, and is configured to:
   analyze the electrical signals that correspond to the detected optical signals of each respective optical path,
   determine at least one of a loss of signal (LOS) or loss of light (LOL) at each of the fiber input ports based on the analysis of the electrical signals, and
   send a report, via the optical port to the second optical fiber panel unit, including a status of the first optical fiber panel unit and any determined LOS or LOL at each of the plurality of fiber input ports.

2. The first optical fiber panel unit of claim 1, wherein the multiple optical fibers connect the first optical fiber panel unit to a central office (CO) Optical Add/Drop Multiplexer (OADM).

3. The first optical fiber panel unit of claim 2, wherein the Optical Add/Drop Multiplexer comprises a Reconfigurable Optical Add/Drop Multiplexer (ROADM).

4. The first optical fiber panel unit of claim 1, wherein the multiple optical fibers connect the first optical fiber panel unit to a central office (CO).

5. The first optical fiber panel unit of claim 1, wherein the telemetry circuit further includes a first port connected to an Internet Protocol (IP) network and wherein the telemetry circuit is further configured to:
send, via the first port, a first report including any determined LOS or LOL at each of the fiber input ports to a network administration node.

6. The first optical fiber panel unit of claim 5, wherein the telemetry circuit further includes a second port connected to the Internet Protocol (IP) network and wherein the telemetry circuit is further configured to:
send, via the second port, a second report including any determined LOS or LOL at each of the fiber input ports to a customer network manager node.

7. The first optical fiber panel unit of claim 1, wherein the first optical fiber panel unit is located at a central office (CO) in a network and is configured to connect between an Optical Add/Drop Multiplexer and a customer location.

8. The first optical fiber panel unit of claim 1, wherein the first optical fiber panel unit is located at a customer location and is configured to connect between the multiple optical fibers and one or more customer site equipment.

9. A method, comprising:
tapping, within a fiber panel comprising a first plurality of fiber input connector ports and a second plurality of fiber output connector ports, multiple optical paths connected to the plurality of fiber input connector ports and supplying a tapped optical output from each of the multiple optical paths to a respective photodetector;
detecting, at each respective photodetector, the tapped optical output to generate electrical signals corresponding to optical signals received via the first plurality of fiber input connector ports and carried via the multiple optical paths;
analyzing, using telemetry circuitry within the fiber panel, the electrical signals to determine performance characteristics associated with each one of the plurality of fiber input connector ports; and
sending, via a fiber panel connection to an external network device, one or more reports that include the determined performance characteristics with each one of the plurality of fiber input connector ports, wherein the external network device comprises a network administration node and wherein the one or more reports identify equipment connected to each of the ports.

10. The method of claim 9, wherein sending the one or more reports comprises sending the one or more reports via an Internet Protocol (IP) network.

11. The method of claim 9, wherein the fiber panel is disposed at a Central Office (CO) within an optical network.

12. The method of claim 9, wherein the fiber panel is disposed at a customer location within an optical network.

13. The method of claim 9, wherein the performance characteristics comprise at least one of a loss of light (LOL) or loss of signal (LOS) associated with each one of the plurality of fiber input connector ports.

14. An optical fiber panel unit, comprising:
a plurality of fiber input ports, each configured to connect to a different one of multiple optical fibers connected to a Central Office (CO) in an optical network, wherein each fiber input port includes a connector connected to a respective fiber panel optical path that carries optical signals within the optical fiber panel unit;
a plurality of fiber output ports, wherein each fiber output port includes a connector port connected to the respective fiber panel optical path that carries the optical signals within the fiber panel unit;
a network connector port configured to connect to an external network; and
a telemetry circuit configured to:
analyze optical input received via each of the plurality of fiber input ports and carried via the respective fiber panel optical path,
determine performance characteristics associated with each fiber input port of the plurality of fiber input ports of the optical fiber panel unit based on the analysis of the optical input, and
send, via the network connector port, one or more reports that include the performance characteristics associated with each fiber input port of the plurality of fiber input ports of the optical fiber panel unit,
wherein at least one of the plurality of fiber output ports connects to site equipment at a customer location and wherein the one or more reports identifies the site equipment.

15. The optical fiber panel unit of claim 14, wherein the performance characteristics comprise a loss of light (LOL) and a loss of signal (LOS) associated with the optical input of each fiber input port of the optical fiber panel unit.

16. An optical fiber panel unit, comprising:
a first fiber input port connected to a first fiber panel optical path and configured to connect to a first input optical fiber, and comprising first components configured to produce first electrical signals that correspond to first optical signals received from the first input optical fiber and carried over the first fiber panel optical path;
a first fiber output port connected to the first fiber panel optical path, and configured to connect to a first output optical fiber that further connects to an optical destination device, and to carry the first optical signals to the first output optical fiber;
telemetry components configured to:
analyze the first electrical signals, and
determine performance characteristics associated with the first fiber input port based on the analysis of the first electrical signals; and
an optical service channel (OSC) port connected to the telemetry components and configured to connect to an OSC optical fiber that further connects to the optical destination device,
wherein the telemetry components are further configured to:
send a report, via the OSC port, to the optical destination device, wherein the report includes a status of the optical fiber panel unit and the determined performance characteristics associated with the first fiber input port.

17. The optical fiber panel unit of claim 16, wherein the first fiber input port further comprises:
a first connector port connected to the first fiber panel optical path,
a first optical tap coupled to the first fiber panel optical path, and
a first photo-detector coupled to the first optical tap and configured to:
detect the first optical signals carried over the first fiber panel optical path, and
produce the first electrical signals that correspond to the detected first optical signals.

18. The optical fiber panel unit of claim 16, further comprising:
- a second fiber input port connected to a second fiber panel optical path and configured to connect to a second input optical fiber, and comprising second components configured to produce second electrical signals that correspond to second optical signals received from the second input optical fiber and carried over the second fiber panel optical path; and
- a second fiber output port connected to the second fiber panel optical path, and configured to connect to a second output optical fiber that further connects to the optical destination device, and to carry the second optical signals to the second output optical fiber;
- wherein the telemetry components are further configured to:
    - analyze the second electrical signals, and
    - determine performance characteristics associated with the second fiber input port based on the analysis of the second electrical signals,
    - wherein the report further includes the determined performance characteristics associated with the second fiber input port.

19. The optical fiber panel unit of claim 16, further comprising an electrical port connected to an Internet Protocol (IP) network, and
- wherein the telemetry components are further configured to:
    - send, via the electrical port to a network administration node or a customer network manager node, a second report that includes the determined performance characteristics associated with the first fiber input port.

20. The optical fiber panel unit of claim 16, wherein the optical destination device comprises a second optical fiber panel unit, and
- wherein, when determining the performance characteristics associated with the first fiber input port, the telemetry components are configured to determine at least one of a loss of signal (LOS) or a loss of light (LOL) at the first fiber input port.

* * * * *